US010761204B2

(12) United States Patent
Amihood et al.

(10) Patent No.: US 10,761,204 B2
(45) Date of Patent: Sep. 1, 2020

(54) RADAR ATTENUATION MITIGATION

(71) Applicant: Google LLC, Mountain View, CA (US)

(72) Inventors: Patrick M. Amihood, Palo Alto, CA (US); David Weber, San Francisco, CA (US); Houshang Aghahassan, Saratoga, CA (US); Abhijit A. Shah, Foster City, CA (US); Jaime Lien, Mountain View, CA (US)

(73) Assignee: Google LLC, Mountain View, CA (US)

( * ) Notice: Subject to any disclaimer, the term of this patent is extended or adjusted under 35 U.S.C. 154(b) by 346 days.

(21) Appl. No.: 15/844,493

(22) Filed: Dec. 15, 2017

(65) Prior Publication Data
US 2019/0187270 A1 Jun. 20, 2019

(51) Int. Cl.
G01S 13/72 (2006.01)
G01S 13/24 (2006.01)
(Continued)

(52) U.S. Cl.
CPC ............. G01S 13/72 (2013.01); G01S 13/24 (2013.01); G01S 13/931 (2013.01); G01S 7/023 (2013.01);
(Continued)

(58) Field of Classification Search
CPC ........ G01S 13/72; G01S 13/24; G01S 13/931; G01S 7/023; G01S 2007/027;
(Continued)

(56) References Cited

U.S. PATENT DOCUMENTS 5,012,251 A * 4/1991 Kennedy ................. G01S 7/026
342/173
5,163,176 A * 11/1992 Flumerfelt ............ G01S 7/2813
342/174
(Continued)

FOREIGN PATENT DOCUMENTS

DE 20219029 3/2003
DE 102007062945 6/2009
(Continued)

OTHER PUBLICATIONS

"International Search Report and Written Opinion", PCT Application No. PCT/US2018/047440, dated Nov. 26, 2018, 17 pages.
(Continued)

Primary Examiner — Bernarr E Gregory
Assistant Examiner — Nuzhat Pervin
(74) Attorney, Agent, or Firm — Colby Nipper PLLC

(57) ABSTRACT

Techniques and apparatuses are described that enable radar attenuation mitigation. To improve radar performance, characteristics of an attenuator and/or properties of a radar signal are determined to reduce attenuation of the radar signal due to the attenuator and enable a radar system to detect a target located on an opposite side of the attenuator. These techniques are beneficial in situations in which the attenuator is unavoidably located between the radar system and a target, either due to integration within other electronic devices or due to an operating environment. These techniques save power and cost by reducing the attenuation without increasing transmit power or changing material properties of the attenuator.

20 Claims, 7 Drawing Sheets

(51) Int. Cl.
*G01S 13/931* (2020.01)
*G01S 7/40* (2006.01)
*G01S 7/02* (2006.01)

(52) U.S. Cl.
CPC . *G01S 2007/027* (2013.01); *G01S 2007/4078* (2013.01); *G01S 2007/4091* (2013.01); *G01S 2013/93276* (2020.01)

(58) Field of Classification Search
CPC ..... G01S 2007/4078; G01S 2007/4091; G01S 2013/9392
USPC .......................................................... 342/95
See application file for complete search history.

(56) References Cited

U.S. PATENT DOCUMENTS

| | | | | |
|---|---|---|---|---|
| 5,172,118 A * | 12/1992 | Peregrim | .................. | G01S 7/36 342/191 |
| 5,172,119 A * | 12/1992 | Young | .................. | G01S 7/2813 342/25 A |
| 5,172,120 A * | 12/1992 | Slawsby | ................. | G01S 13/22 342/25 D |
| 5,172,122 A * | 12/1992 | Peregrim | ............. | G01S 7/2813 342/154 |
| 5,172,125 A * | 12/1992 | Peregrim | ............ | G01S 13/4481 342/154 |
| 5,173,702 A * | 12/1992 | Young | ....................... | G01S 7/36 342/17 |
| 5,173,703 A * | 12/1992 | Mangiapane | ........... | G01S 13/90 342/149 |
| 5,173,707 A * | 12/1992 | Mangiapane | ........... | G01S 13/90 342/149 |
| 5,175,554 A * | 12/1992 | Mangiapane | ....... | G01S 13/4481 342/149 |
| 5,184,137 A * | 2/1993 | Pozgay | ................. | G01S 7/2813 342/174 |
| 5,185,608 A * | 2/1993 | Pozgay | .................. | G01S 7/024 342/17 |
| 5,223,842 A * | 6/1993 | Okurowski | ............... | G01S 7/36 342/173 |
| 5,225,838 A * | 7/1993 | Kanter | ..................... | G01S 7/36 342/61 |
| 5,225,839 A * | 7/1993 | Okurowski | ............. | G01S 7/025 342/174 |
| 5,245,347 A * | 9/1993 | Bonta | ................... | G01S 7/2813 342/149 |
| 5,408,244 A * | 4/1995 | Mackenzie | ............ | H01Q 1/422 343/872 |
| 6,368,276 B1 * | 4/2002 | Bullis | ...................... | A61B 8/00 600/437 |
| 6,420,995 B1 * | 7/2002 | Richmond | ................ | G01S 7/36 342/13 |
| 9,229,102 B1 * | 1/2016 | Wright | .................. | G01S 13/888 |
| 9,494,675 B2 * | 11/2016 | McCorkle | ................ | G01S 7/28 |
| 2010/0026550 A1 * | 2/2010 | Rosenbury | ............. | A61B 5/113 342/22 |
| 2011/0163904 A1 * | 7/2011 | Alland | ..................... | B60R 1/00 342/1 |
| 2014/0118179 A1 * | 5/2014 | Alland | ................ | H01Q 1/1271 342/22 |
| 2014/0313071 A1 * | 10/2014 | McCorkle | ................ | G01S 7/28 342/202 |
| 2015/0123838 A1 * | 5/2015 | Shi | .................... | H01Q 21/0075 342/70 |
| 2016/0054433 A1 * | 2/2016 | Barrow | .................... | G01S 7/34 342/92 |
| 2016/0098089 A1 * | 4/2016 | Poupyrev | ................ | G01S 7/415 345/156 |
| 2016/0231417 A1 * | 8/2016 | Aoki | ....................... | G01S 7/032 |
| 2017/0207513 A1 * | 7/2017 | Miyoshi | .................. | H01Q 1/38 |
| 2017/0274832 A1 * | 9/2017 | Abe | ........................ | G01S 7/025 |
| 2019/0094877 A1 * | 3/2019 | Smith | .................... | B60W 10/04 |
| 2019/0094878 A1 * | 3/2019 | Campbell | ....... | B60W 30/18109 |

FOREIGN PATENT DOCUMENTS

| | | | | |
|---|---|---|---|---|
| DE | 102007062945 A1 * | 6/2009 | .......... | H01Q 1/3283 |
| DE | 102011010861 | 8/2012 | | |
| DE | 102011010861 A1 * | 8/2012 | .............. | H01Q 1/42 |
| DE | 102014213502 | 1/2016 | | |
| DE | 102014213502 A1 * | 1/2016 | .......... | H01Q 1/3233 |
| GB | 2513367 A * | 10/2014 | ................ | G01S 7/34 |
| WO | WO-2014174245 A1 * | 10/2014 | ................ | G01S 7/34 |

OTHER PUBLICATIONS

"International Preliminary Report on Patentability", PCT Application No. PCT/US2018/047440, dated Mar. 6, 2020, 25 pages.
"Written Opinion of the International Preliminary Examining Authority", PCT Application No. PCT/US2018/047440, dated Nov. 19, 2019, 9 pages.
"EP Appeal Decision", European Application No. 10194359.5, May 28, 2019, 20 pages.
"Galaxy S4 Air Gesture", Galaxy S4 Guides, https://allaboutgalaxys4.com/galaxy-s4-features-explained/air-gesture/, 4 pages.
"Samsung Galaxy S4 Air Gestures", Video from https://www.youtube.com/watch?v=375Hb87yGcg, May 7, 2013.

* cited by examiner

RADAR ATTENUATION MITIGATION

BACKGROUND

Radars are useful devices that can detect and track objects, map surfaces, and display weather patterns. While radar is a common tool used in military and air traffic control operations, technological advances are making it possible to integrate radars in electronic devices. In many cases, a radar may replace bulky and expensive sensors, such as a camera, and provide improved performance in the presence of different environmental conditions, such as low lighting, motion, or overlapping targets. While it may be advantageous to use the radar, there are many challenges associated with using radar in commercial devices and commercial applications.

One such problem involves integrating and operating the radar in the presence of an attenuator. The attenuator may include an exterior housing of the electronic device or another external material that attenuates or distorts a radar signal. As available power may be limited in small and mobile radar systems, compensating for the attenuation by increasing the transmitted power may not be possible. As such, the attenuator degrades performance of the radar by decreasing an effective range, limiting the ability to detect smaller targets, and reducing tracking accuracy. Consequently, the effective operation and capability of the radar can be significantly reduced due to the attenuator, thereby frustrating users or limiting the types of applications or environments the radar can support.

SUMMARY

Techniques and apparatuses are described that enable radar attenuation mitigation. To improve radar performance, characteristics of an attenuator and/or properties of a radar signal are determined to reduce attenuation of the radar signal due to the attenuator and enable the radar system to detect a target located on an opposite side of the attenuator. These techniques are beneficial in situations in which the attenuator is unavoidably located between the radar system and a target, either due to integration within other electronic devices or due to an operating environment. These techniques save power and cost by reducing the attenuation without increasing transmit power or changing material properties of the attenuator.

Aspects described below include an apparatus comprising a radar system and an attenuator. The radar system operates within a frequency range and a range of steering angles. The radar system transmits a radar signal using a frequency of the frequency range and a steering angle of the range of steering angles to detect a target. The attenuator is located between the radar system and the target. The attenuator has a semi-transparent material that attenuates the radar signal. The attenuator is located at a distance from the radar system and has a non-zero thickness. The distance is a best distance within the range of distances and the non-zero thickness is a best thickness within the range of thicknesses. The best distance and the best thickness are effective to mitigate attenuation of the radar signal to within approximately thirty percent of a minimum attenuation that exists across the range of distances and the range of thicknesses for the frequency of the radar signal and the steering angle of the radar signal.

Aspects described below also include a system comprising an attenuator and a radar system. The attenuator has a thickness and semi-transparent material that attenuates a radar signal. The radar system is located on a side of the attenuator. The radar system determines a desired frequency and a desired steering angle of the radar signal based on the thickness of the attenuator and a distance between the attenuator and the radar system. In addition, the radar system transmits the radar signal using the desired frequency and the desired steering angle effective to detect a target that is located on an opposite side of the attenuator.

Aspects described below also include a method comprising determining, by a radar system, a thickness of an attenuator that is located between the radar system and a target. The attenuator has a semi-transparent material that attenuates a radar signal. The method also includes determining, by the radar system, a distance between the attenuator and the radar system. Based on the thickness of the attenuator and the distance between the attenuator and the radar system, a desired frequency and a desired steering angle of the radar signal that mitigates attenuation of the radar signal through the attenuator is determined. Using the desired frequency and the desired steering angle, the method further includes transmitting the radar signal effective to detect the target through the attenuator.

Aspects described below also include a system comprising means for determining a characteristic of an attenuator or a property of a radar signal to mitigate attenuation of the radar signal that passes through the attenuator.

BRIEF DESCRIPTION OF THE DRAWINGS

Apparatuses of and techniques enabling radar attenuation mitigation are described with reference to the following drawings. The same numbers are used throughout the drawings to reference like features and components.

DETAILED DESCRIPTION

Overview

This document describes techniques and devices enabling radar attenuation mitigation. These techniques and devices are designed to improve radar performance by mitigating attenuation and distortion effects of an attenuator by determining characteristics of the attenuator or properties of a radar signal.

Typically a radar system includes a radome or some form of housing composed of a radio-frequency transparent material. The radome protects the radar's antennas from weather and debris, while minimally attenuating a radar signal that passes through the radome. While electronic devices can have external housings or protective cases that can protect an embedded radar system, these housings are not typically designed for radar applications. In some cases, these housings are made of materials that attenuate or distort the radar signal, thereby decreasing an effective range and accuracy of the radar system.

The attenuator presents a challenge for performing radar operations compared to other forms of wireless communication. In one aspect, the radar signal passes through the attenuator twice, once during transmission and again during reception. Therefore, the attenuator degrades the radar signal more than a one-way wireless communication signal. Furthermore, any changes in amplitude or phase of the radar signal due to the attenuator directly impacts the radar system's ability to determine location, movement, or characteristics of a target. In contrast, wireless communication signals can utilize redundancy and error correcting techniques to mitigate the effects of the attenuator and reliably communicate information to other devices.

Instead of increasing transmit power or changing material properties of the attenuator, techniques for radar attenuation mitigation are described. This document now turns to an example environment, after which example systems, example methods, and an example computing system are described.

Example Environment

Figure 1:
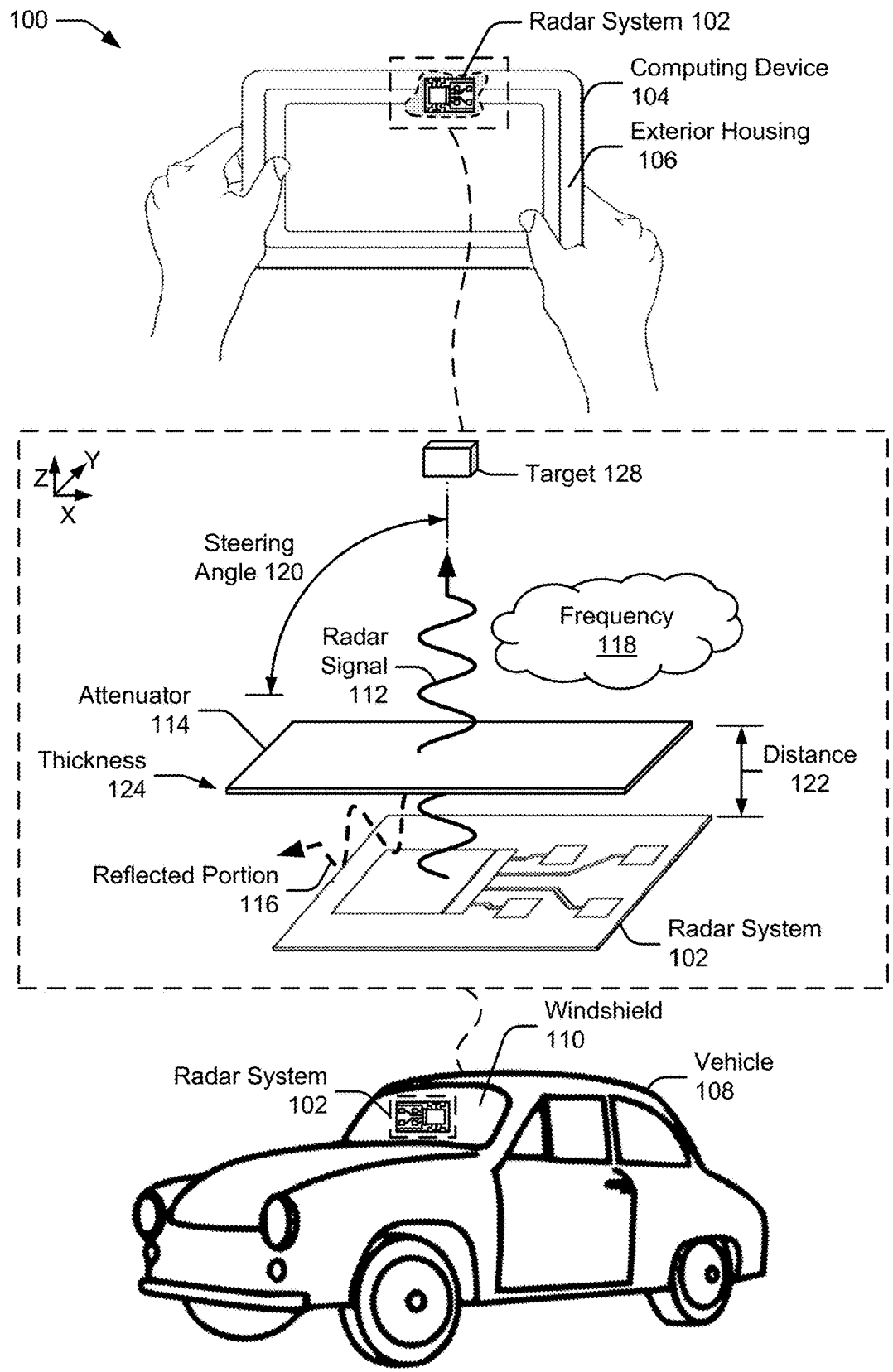
FIG. 1 illustrates an example environment in which radar attenuation mitigation can be implemented.

FIG. 1 is an illustration of an example environment 100 in which techniques using, and an apparatus including, radar attenuation mitigation may be embodied. Environment 100 includes two devices and techniques for using a radar system 102. In a first example, the radar system 102 is embedded in a computing device 104 that has an exterior housing 106. In a second example, the radar system 102 operates inside a vehicle 108 that has a windshield 110.

The computing device 104 may use the radar system 102 to detect a presence of a user, map the user's face for authentication, track the user's gestures for touch-free control, and so forth. To perform these operations, the radar system 102 transmits and receives a radar signal 112. As the radar system 102 is integrated within the computing device 104, the radar signal 112 passes through portions of the computing device 104, such as the exterior housing 106. In this example, the exterior housing 106 represents an attenuator 114 that is opaque or semi-transparent to the radar signal 112. In other words, the attenuator 114 decreases an amplitude of the radar signal 112 or distorts the radar signal 112. In some cases, the attenuator 114 reflects a portion of the radar signal 112 (shown by reflected portion 116).

An amount of the reflected portion 116 is dependent upon properties of the radar signal 112 and characteristics of the attenuator 114. Example properties of the radar signal 112 may include a frequency 118, a steering angle 120, a bandwidth, a beamshape, and so forth. Example characteristics of the attenuator 114 may include a distance 122 between the radar system 102 and the attenuator 114, a thickness 124 of the attenuator 114, material properties of the attenuator 114 such as a dielectric constant, an orientation of the attenuator 114, and so forth. Assuming a transmit power of the radar system 102 is limited and re-designing the exterior housing 106 is not desirable, techniques for radar attenuation mitigation improves performance of the radar system 102 by changing one or more of these attenuation-dependent properties and characteristics. As a result, the radar system 102 realizes better accuracy and larger effective ranges for detecting and tracking a target 128 that is located on an opposite side of the attenuator 114.

Similarly, consider the vehicle 108, which includes the radar system 102 mounted inside the vehicle 108 on the dashboard or on an inside of the windshield 110. The vehicle 108 may use the radar system 102 for collision avoidance, assisted driving, or, in the case of law enforcement, detecting traffic violations. To perform these operations, however, the radar system 102 transmits and receives the radar signal 112 through the windshield 110, which acts as the attenuator 114. During operation, the radar system 102 may determine the distance 122 or the thickness 124 of the windshield 110 and adjust the frequency 118 or the steering angle 120 to improve performance of the radar system 102. In situations in which a location of the radar system 102 is generally fixed relative to the attenuator 114, these determinations and adjustments can be made upon initialization of the radar system 102. In other situations in which the radar system 102 is mobile (e.g., the radar system 102 is wearable by the user), these determinations can be made multiple times during the operation of the radar system 102 and therefore enable dynamic real-time adjustments by the radar system 102.

These techniques are beneficial in situations in which the attenuator is unavoidably located between the radar system 102 and the target 128, either due to integration within other electronic devices or due to the operating environment. In addition, these techniques can be used to support mobile radar applications and can further assist inexperienced users in placing the radar system 102. Furthermore, these techniques save power and reduce cost by improving radar performance without increasing transmit power or changing material properties of the attenuator. As described in further detail below, many of these techniques can be performed during integration or operation of the radar system 102.

Figure 2:
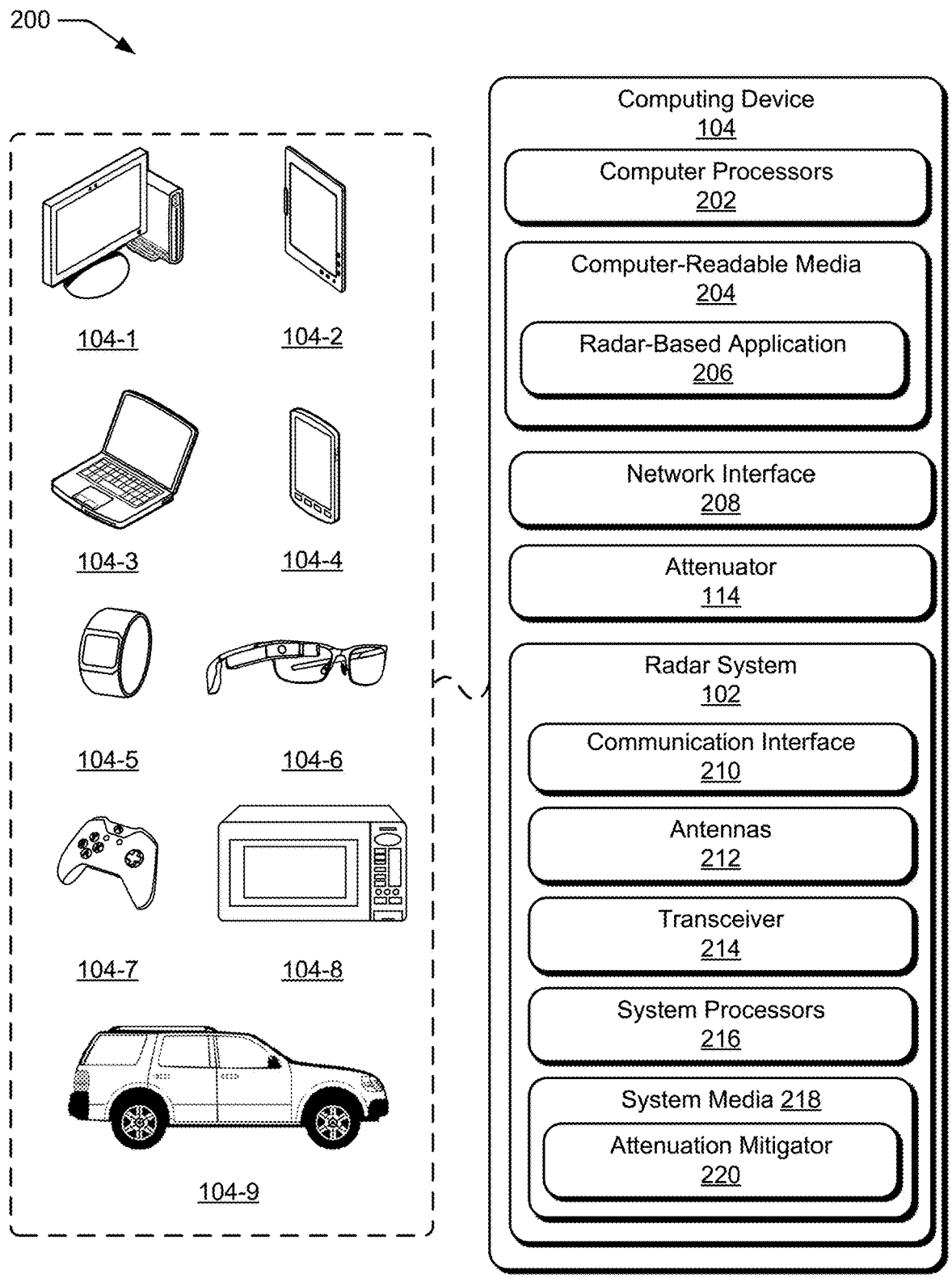
FIG. 2 illustrates an example radar system as part of a computing device.

In more detail, consider FIG. 2, which illustrates the radar system 102 as part of the computing device 104. The computing device 104 is illustrated with various non-limiting example devices including a desktop computer 104-1, a tablet 104-2, a laptop 104-3, a smailphone 104-4, a computing watch 104-5, computing glasses 104-6, a gaming system 104-7, a microwave 104-8, and a vehicle 104-9. The computing device 104 can also include a home security system in which the radar system 102 is mounted inside a home to monitor an outside environment through a window. Other devices may also be used, such as televisions, drones, track pads, drawing pads, netbooks, e-readers, home-automation and control systems, and other home appliances. Note that computing device 104 can be wearable, non-wearable but mobile, or relatively immobile (e.g., desktops and appliances).

The radar system 102 can be used as a stand-alone radar system or used with, or embedded within, many different computing devices 104 or peripherals, such as in control panels that control home appliances and systems, in automobiles to control internal functions (e.g., volume, cruise control, or even driving of the car), or as an attachment to a laptop computer to control computing applications on the laptop.

The computing device 104 includes one or more computer processors 202 and computer-readable media 204, which includes memory media and storage media. Applications and/or an operating system (not shown) embodied as computer-readable instructions on the computer-readable media 204 can be executed by the computer processors 202 to provide some of the functionalities described herein. The computer-readable media 204 also includes a radar-based application 206, which uses radar data generated by the radar system 102 to perform a function, such as gesture-based control, facial mapping, or user authentication. The radar-based application 206 can also enable user control or configuration of the radar system 102. In some cases, the radar-based application 206 or the computer-readable media 204 stores pre-determined information regarding the attenuator 114, such as the distance 122 or the thickness 124.

The computing device 104 may also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The computing device 104 may also include a display (not shown).

The computing device 104, or an external object separate from the computing device 104, includes the attenuator 114 for which the radar signal 112 passes through. In general, the attenuator 114 has a material that is opaque or semi-transparent to the radar signal 112. The attenuator 114, for example, may be composed of a dielectric material that has a dielectric constant (e.g., relative permittivity) between approximately four and ten. Example dielectric materials can include different types of glass or plastics, some of which may be found within display screens, exterior housings, or other components of the computing device 104. Assuming the computing device 104 is the smailphone 104-4, the attenuator 114 can include, for example, a glass display screen of the smailphone 104-4. Through absorption or reflection, the attenuator 114 obstructs a portion of the radio signal 112. In some cases, the thickness 124 of the attenuator 114 can be set during manufacturing or adjusted by another attenuator 414 (illustrated in FIG. 4).

The radar system 102 is located on one side of the attenuator 114. In some cases, a compliant layer that is substantially transparent to the radar signal 112 can be positioned between the radar system 102 and the attenuator 114. The compliant layer can include air, an air bladder, silicone, foam, a conformal lattice structure, and so forth. In other cases, a material layer made from adhesive, tape, or glue, can be positioned between the radar system 102 and the attenuator 114. This material layer can assist with integrating the radar system 102 in the computing device 104 by enabling the distance 122 to be fined tuned. Furthermore, the material layer can assist in making the distance 122 uniform across the physical dimensions of radar system 102. In considering the manufacturing of multiple computing devices 104 that have a radar system 102, the material layer can also reduce variations in the distance 122 across the multiple computing devices 104, thereby enabling the multiple radar systems 102 to be similarly setup and implement the techniques of radar attenuation mitigation based on the distance 122. If the material layer also attenuates the radar signal 112 (e.g., the material layer is semi-transparent to the radar signal 112), the material layer can further be used to fine tune the thickness 124 of the attenuator 114.

The radar system 102 includes a communication interface 210 to transmit the radar data to a remote device, though this need not be used when the radar system 102 is integrated within the computing device 104. In general, the radar data provided by the communication interface 210 is in a format usable by the radar-based application 206.

The radar system 102 also includes one or more antennas 212 and a transceiver 214 to transmit and receive the radar signal 112. The radar signal 112 can be steered or un-steered, wide or narrow, or shaped (e.g., hemisphere, cube, fan, cone, cylinder). The steering and shaping of the radar signal 112 can be achieved using analog or digital beamforming techniques and configured based on a size of the target 128 or an estimated location of the target 128. Generally, the steering angle 120 of the radar signal 112 represents a direction that a main beam is transmitted by the radar system 102 and includes both azimuth and elevation angles.

The radar system 102 can be configured for continuous wave or pulsed radar operations. A variety of modulations can be used, including linear frequency modulation, stepped frequency modulations, and phase modulations. The radar system 102 can be configured to emit microwave radiation in a 1 GHz to 300 GHz range, a 3 GHz to 100 GHz range, and narrower bands, such as 57 GHz to 63 GHz. In general, the radar system 102 operates using a range of frequencies, a portion of which may be used for transmitting the radar signal 112 based on a center frequency and a bandwidth.

The radar system 102 may also include one or more system processors 216 and a system media 218 (e.g., one or more computer-readable storage media). The system media 218 includes an attenuation mitigator 220, which can configure the radar system 102 for operation in the presence of the attenuator 114. For example, the attenuation mitigator 220 can send commands to the transceiver 214 to control the frequency 118 or the steering angle 120 of the radar signal 112. As another example, the attenuation mitigator 220 can prompt the user via the computing device. In some cases, the attenuation mitigator 220 receives the pre-determined characteristic of the attenuator 114 that is stored in the computer-readable media 204 via the computing device 104. Alternatively, the attenuation mitigator 220 can process the radar signal 112 to measure one or more characteristics of the attenuator 114. In general, the attenuation mitigator 220 performs frequency selection, steering angle selection, distance selection, or thickness selection to achieve the desired radar performance, as described in further detail with respect to FIGS. 3 and 4.

Figure 3:
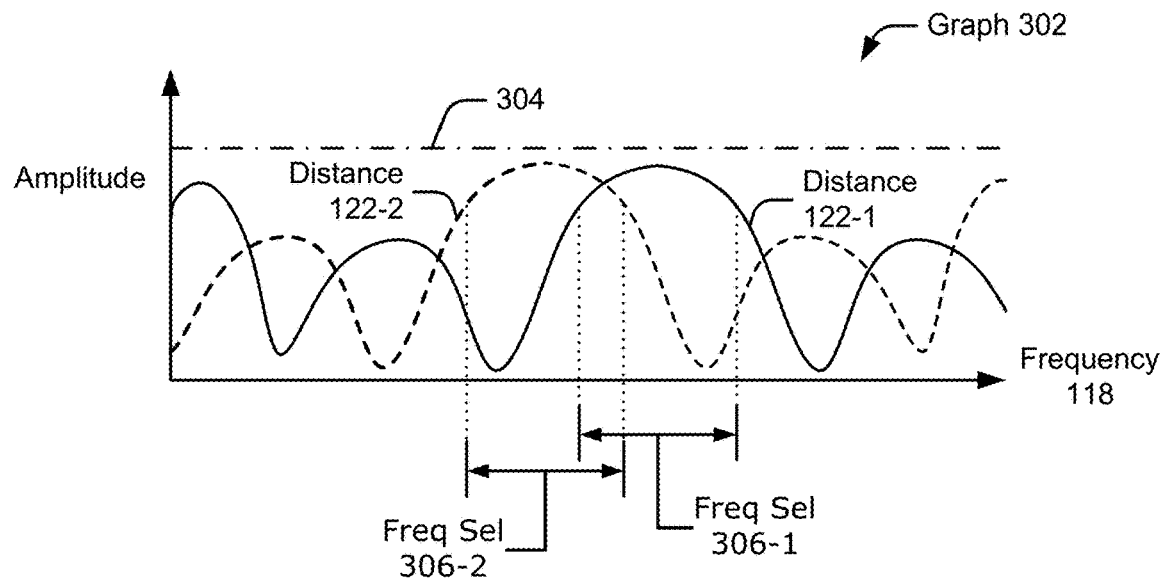
FIG. 3 illustrates example techniques for adjusting a frequency of a radar signal or a distance between a radar system and an attenuator.
Figure 3:
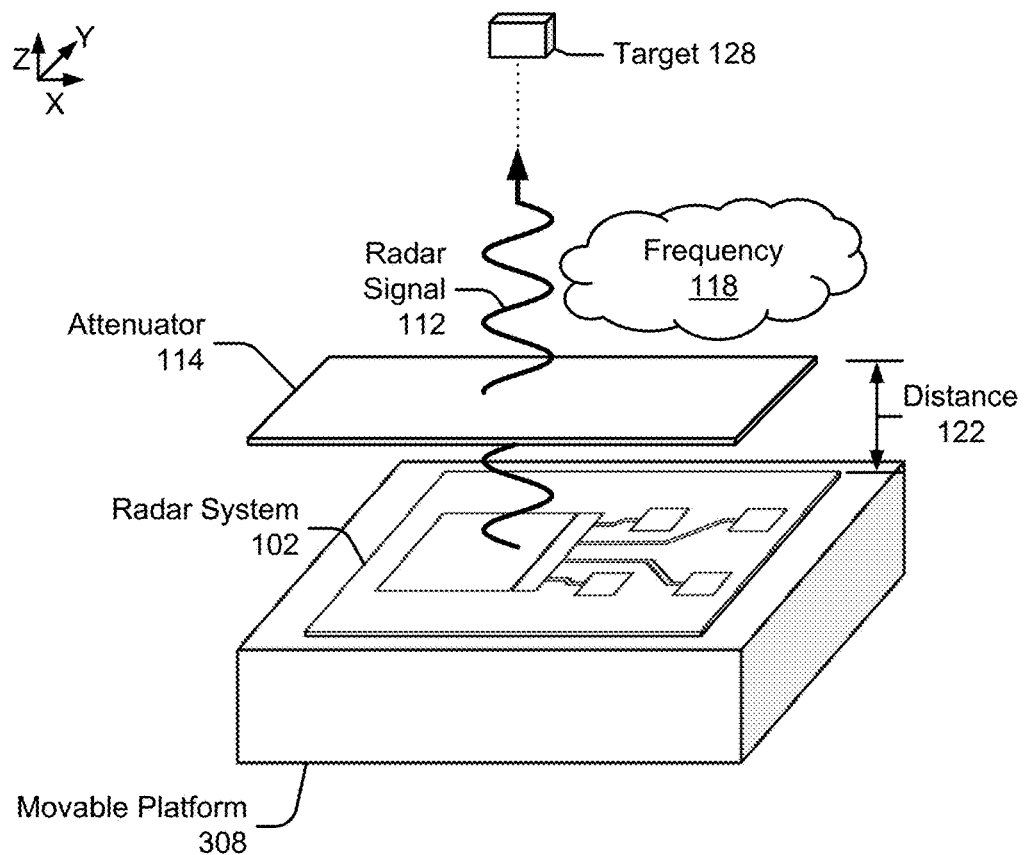

FIG. 3 illustrates example techniques for adjusting the frequency 118 of the radar signal 112 or the distance 122 between the radar system 102 and the attenuator 114. An example graph 302 plots an amplitude of the radar signal 112 versus the frequency 118 for different distances 122. Three example are considered, including a first distance 122-1 (shown by a solid line), a second distance 122-2 (shown by a dashed line), and a situation 304 without the attenuator 114 (shown by a dotted-dashed line). For illustration purposes, the graph 302 is not drawn to scale.

As shown by 304, the amplitude for different frequencies 118 is approximately the same if the attenuator 114 is not present. In contrast, the plots of the first distance 122-1 and the second distance 122-2 show a peak amplitude of the radar signal 112 is reduced due to the presence of the attenuator 114. The peak amplitude for the first distance 122-1, for example, may be approximately 0.5 decibels (dB) less than the amplitude shown by 304. Furthermore, the amplitude varies based on the frequency 118, which can differ by approximately 0.5 dB to 10 dB with respect to 304. In comparing the attenuation between the first distance 122-1 and the second distance 122-2, some frequencies experience more or less attenuation due to the attenuator 114.

The variation in the amplitude across different frequencies 118 also causes spectral distortion of the radar signal 112. Consider, for example, that the radar system 102 selects a center frequency and a bandwidth for performing frequency modulation. However, at least a portion of the selected frequencies are significantly attenuated by the attenuator 114 compared to the other portion of the selected frequencies. In this situation, the attenuator 114 produces a window effect that reduces an effective bandwidth of the radar signal 112.

Consequently, a total signal-to-noise ratio of the radar signal 112 is reduced, which further degrades radar performance.

A first technique determines the frequency 118 based on the distance 122. For example, a first frequency selection 306-1 can be chosen for the first distance 122-1 and a second frequency selection 306-2 can be chosen based for the second distance 122-2 to achieve a desired amplitude of the radar signal 112. Consider if the radar system 102 is integrated within the computing device 104, the first frequency selection 306-1 can represent a range of frequencies from approximately 60 to 62 gigahertz (GHz) for the first distance 122-1 of approximately 0.25 millimeters (mm) and the second frequency selection can represent a range of frequencies from approximately 59 to 61 GHz for the second distance 122-2 of 0.75 mm. If the distance 122 is substantially fixed, pre-determined, and stored in the computer-readable media 204, the attenuation mitigator 220 can select the frequency 118 based on the distance 122. In other situations, the attenuation mitigator 220 can measure the distance 122 and automatically determine the frequency 118. Based on the frequency selection 306 and the attenuation amount, the attenuation mitigator 220 can also sub-divide and rank the frequencies 118 into multiple bandwidths and center frequencies, to support frequency diversity, Doppler blind avoidance, and interference avoidance.

In some cases, the radar system 102 may have a limited range of frequencies 118 that are available during operation either by design or due to other types of operational factors, such as those mentioned above. A second technique determines the distance 122 based on the frequency 118. If the desirable operating frequency range is, for example, between approximately 59 GHz and 61 GHz, the distance can be set to approximately 0.5 mm to improve the amplitude of the radar signal 112. Consider if the radar system 102 is integrated within the computing device 104, the distance 122 can be set to the desired amount during fabrication. In some cases, the radar system 102 may be mounted to a movable platform 308 that can adjust the distance 122 automatically via the attenuation mitigator 220. The movable platform 308 may include a piezoelectric material, a movable microplatform, a spring or gear-driven platform, and so forth. If the attenuator 114 is external to the computing device 104 and the radar system 102 is mobile, the attenuation mitigator 220 can prompt the user via the radar-based application 206 to move the radar system 102 and adjust the distance 122, thereby improving radar performance.

Figure 4:
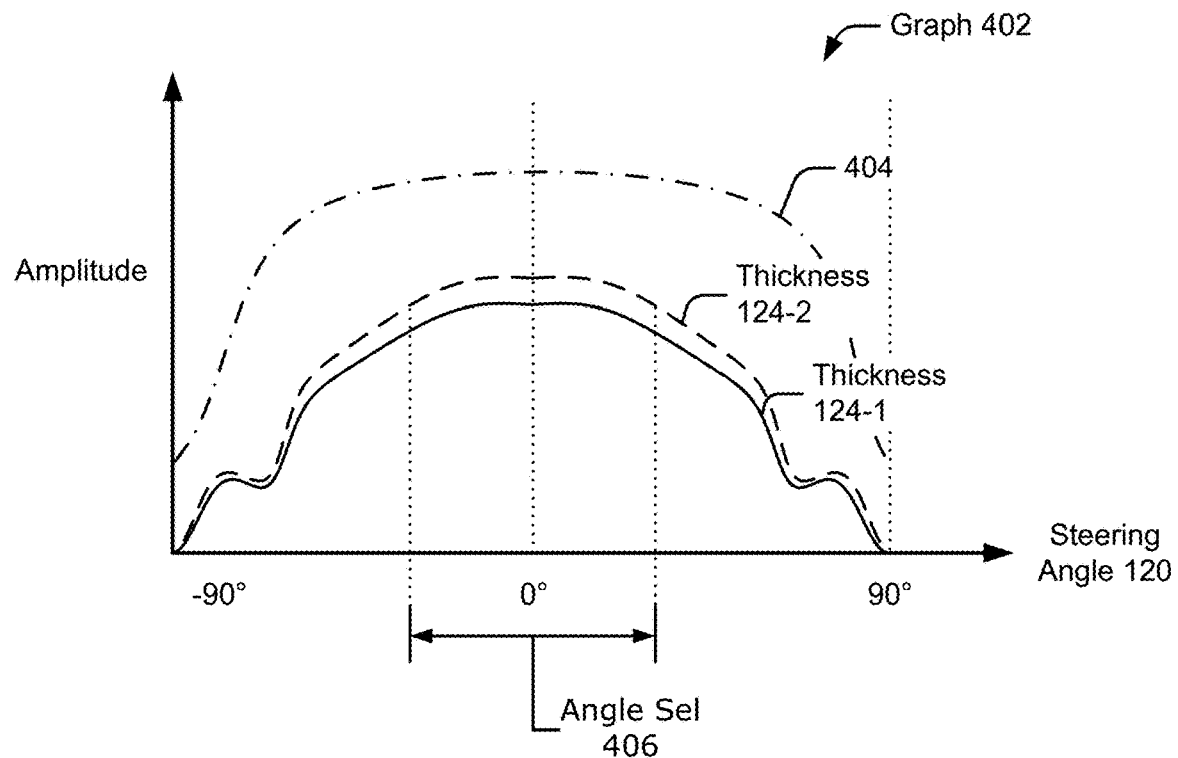
FIG. 4 illustrates example techniques for adjusting a steering angle of a radar signal or a thickness of an attenuator.
Figure 4:
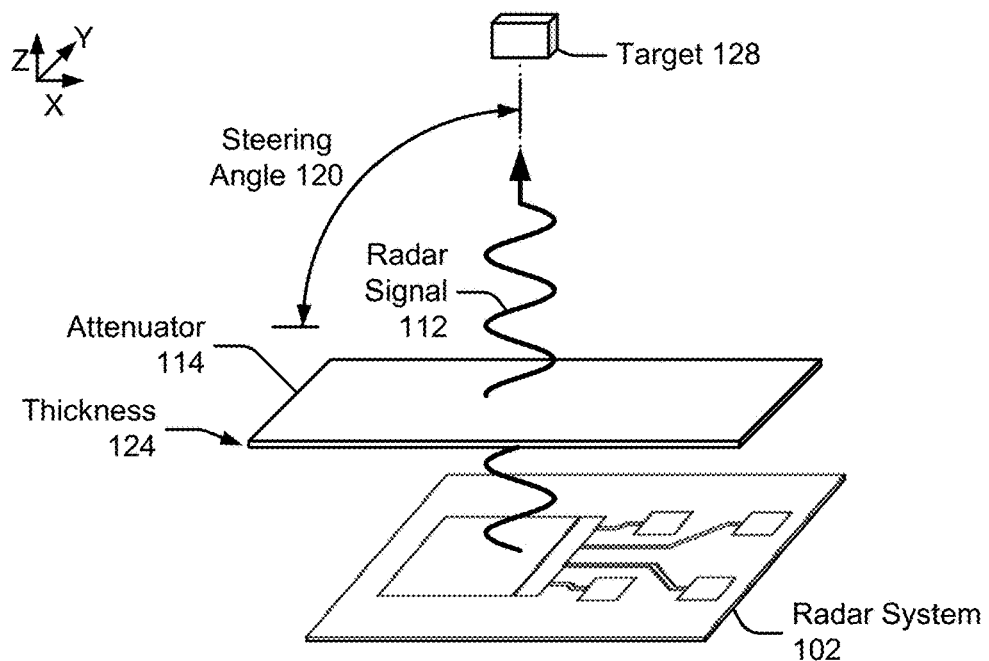

FIG. 4 illustrates example techniques for adjusting the steering angle 120 of the radar signal 112 or the thickness 124 of the attenuator 114. An example graph 402 plots the amplitude of the radar signal 112 versus the steering angle 120 for different thicknesses 124. Three examples are considered, including a first thickness 124-1 (shown by a dashed line), a second thickness 124-2 (shown by a dashed line), and a situation 404 without the attenuator 114 (shown by a dotted-dashed line). For illustration purposes, the graph 402 is not drawn to scale.

As shown by 404, the amplitude for different steering angles 120 is approximately the same across a wide range of steering angles 120 if the attenuator 114 is not present. This range may include, for example, steering angles 120 between approximately −45 and 45 degrees. In contrast, the plots of the first thickness 124-1 and the second thickness 124-2 show smaller amplitudes of the radar signal 112. In some cases, the reduction in amplitude can be approximately 10 dB or more. Furthermore, the range of steering angles 120 for which the amplitude does not significantly change can be smaller due to the attenuator 114, such as between −30 and 30 degrees. A third technique determines the steering angle 120 or an angle selection 406 for the radar signal 112 based on the thickness 124. In some cases, the radar system 102 can be angled relative to an anticipated target location such that the desired steering angle 120 can be used to detect the target 128.

As seen in the graph 402, the amplitude of the radar signal 112 may also vary based on the thickness 124 of the attenuator 114. In some implementations, increasing the thickness 124 decreases reflection of the radar signal 112. For example, the thickness 124 of the exterior housing 106 can be increased from approximately 0.5 mm to 1.0 mm, which causes the attenuation to decrease by at least approximately 0.5 dB. The thickness 124 of the exterior housing 106 can be set to the desired value during fabrication, by applying another attenuator 414 to a side of the exterior housing 106 (e.g., a layer of adhesive, tape, or glue), or by attaching another attenuator 414 (e.g., a protective case). In general, applying or attaching the other attenuator 414 increases an effective thickness of the attenuator 114. The attenuation mitigator 220 can also prompt the user via the radar-based application 206 to apply the other attenuator 414. In some cases, the thickness 124 of the attenuator 114 can be adjusted across an area through which the radar system 102 is expected to direct the radar signal 112.

In general, the attenuation of the radar signal 112 depends on the frequency 118 of the radar signal 112, the distance 122 between the radar system 102 and the attenuator 114, the steering angle 120 of the radar signal 112, and the thickness 124 of the attenuator 114. The techniques for radar attenuation mitigation enable one or more of these above-mentioned parameters to be adjusted, thereby mitigating the effects of the attenuator 114 and achieving the desired amplitude that enables the radar system 102 to detect the target 128 with a desired accuracy and effective range. As described in the examples above, the widest range of frequencies 118, the widest range of steering angles 120, the closest distance 122, or the smallest thickness 124 may not be desirable when the radar system 102 is in the presence of the attenuator 114. However, by balancing each of these parameters, a desired value of the frequency 118, the steering angle 120, the distance 122, and the thickness 124 can be determined to support radar operations without increasing the transmit power. Sometimes one or more of these attenuation-dependent characteristics and properties are fixed or constrained and can be used to determine the other attenuation-dependent characteristics and properties.

Figure 5:
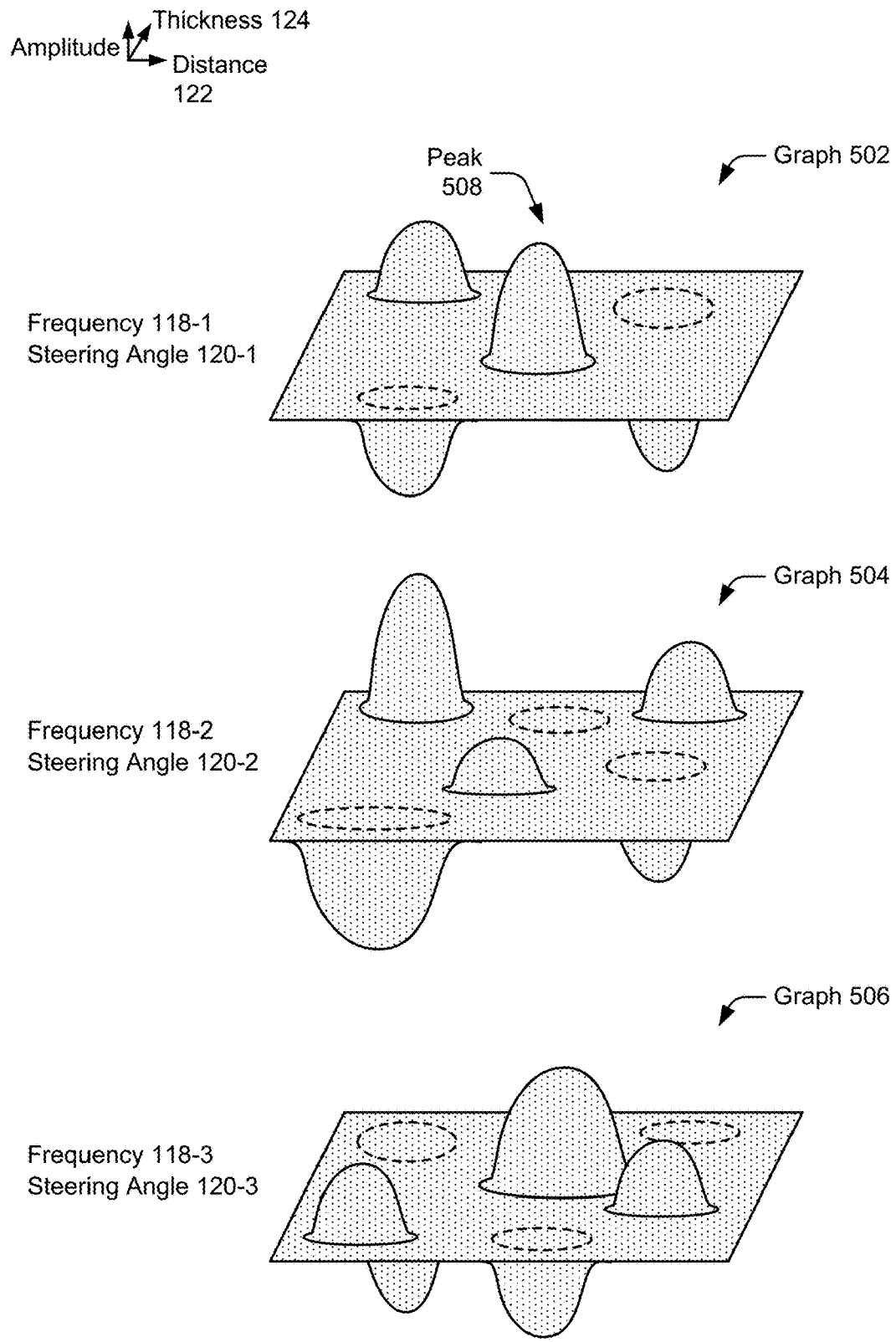
FIG. 5 illustrates example graphs for optimizing radar attenuation mitigation.

FIG. 5 illustrates example graphs for optimizing radar attenuation mitigation. As explained above, any one or more of the above-mentioned characteristics and parameters can be adjusted to achieve the desired amount of attenuation and enable the radar system 102 to detect the target 128 through the attenuator 114. In other words, a four-variable solution exists, in which the frequency 118 of the radar signal 112, the distance 122 between the radar system 102 and the attenuator 114, the steering angle 120 of the radar signal 112, or the thickness 124 of the attenuator 114 are chosen to mitigate the attenuation.

Consider a simulation that generates amplitude plots for different values of the four variables. Constraints can be placed on these four variables for determining a maximum possible amplitude. If the attenuator 114 is the exterior housing 106 of FIG. 1, for example, the thickness of the exterior housing 106 can be constrained by a desired exterior housing strength and an ergonomic size or weight of the computing device 104. Additionally, if the radar system 102 is integrated within the computing device 104, the distance 122 may be constrained based on manufacturing techniques and a desired size of the computing device 104. In some cases, the frequencies 118 may be constrained by hardware of the radar system 102 or operating conditions, such as to avoid interfering with another radar system 102. Furthermore, the steering angles 120 may be constrained to reduce angular ambiguities or to avoid illuminating other components in the computing device 104 or other external objects. In the situation described above, example constraints may include the thickness 124 being between approximately 0.2 mm to 2 mm, the distance 122 being between approximately 0 mm to 5 mm, the frequency being approximately 30 GHz or between a range of frequencies, such as between approximately 58 to 60 GHz, and the steering angle 120 being between approximately −45 to 45 degrees.

Using these constraints, the simulation produces results that can be used to select the frequency 118, the steering angle 120, the distance 122, and the thickness 124 based on the maximum possible amplitude. FIG. 5 depicts three example graphs 502, 504, and 506, which represent possible amplitudes of the radar signal 112 through the attenuator 114 for a fixed transmission power. The axes of the graphs 502-506 represent a range of thicknesses 124 and a range of distances 122. Each of the three graphs 502-506 also correspond to different frequencies (e.g., frequencies 118-1, 118-2, and 118-3) and steering angles (e.g., steering angles 120-1, 120-2, and 120-3). Within these graphs, peaks and valleys respectively indicate values of the variables that provide a higher amplitude or a lower amplitude. For example, peak 508 identifies a desired distance 122 and a desired thickness 124 for the frequency 118-1 and the steering angle 120-1 that provides a maximum amplitude.

Based on the graphs 502-506, the frequency 118, the steering angle 120, the distance 122, and the thickness 124 can be determined to achieve the desired amplitude. In general, the desired amplitude may be represented by a percentage of a maximum amplitude. As an example, the percentage may be between approximately 0% to 50% of the peak 508. In terms of attenuation, the variables can be chosen to achieve an attenuation that is within approximately 0% to 50% of a minimum attenuation, including 10%, 20%, 30%, and so forth. Accordingly, the techniques for radar attenuation mitigation enable the attenuation to be reduced to within a desired percentage of the maximum amplitude or the minimum attenuation based on the chosen constraints.

Figure 6:
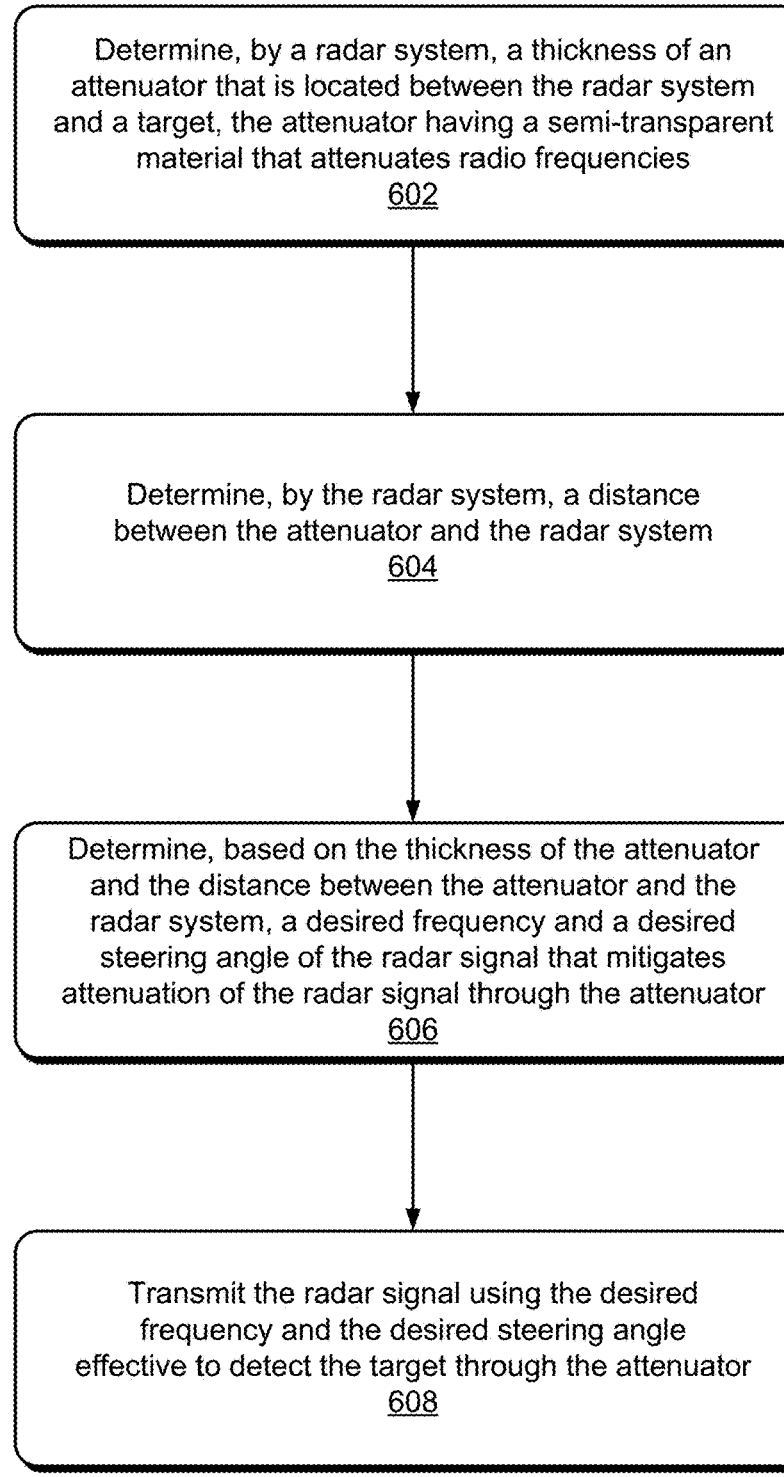
FIG. 6 illustrates an example method for radar attenuation mitigation.

While some of the techniques may be implemented during fabrication or integration of the radar system 102 within the computing device 104, other techniques can be implemented during operation of the radar system 102, as described with respect to FIG. 6.

Example Methods

FIG. 6 depicts an example method 600 for operating the radar system 102 in the presence of the attenuator 114. Method 600 is shown as sets of operations (or acts) performed but not necessarily limited to the order or combinations in which the operations are illustrated. Further, any of one or more of the operations may be repeated, combined, reorganized, or linked to provide a wide array of additional and/or alternate methods. In portions of the following discussion, reference may be made to environment 100 of FIG. 1 and entities detailed in FIG. 2, reference to which is made for example only. The techniques are not limited to performance by one entity or multiple entities operating on one device.

At 602, a thickness of an attenuator that is located between a radar system and a target is determined by the radar system. The attenuator has a semi-transparent material that attenuates radio frequencies. The thickness, for example, can include the thickness 124 of the attenuator 114.

At 604, a distance between the attenuator and the radar system is determined by the radar system. The distance, for example can include the distance 122 between the attenuator 114 and the radar system 102. Depending on the situation, the thickness 124 and the distance 122 at 602 and 604 can be indirectly or directly determined by the radar system 102.

Consider if the radar system 102 is embedded within the computing device 104 of FIG. 1. During assembly, the distance 122 of the radar system 102 from the exterior housing 106 may be fixed as well as the thickness 124 of the exterior housing 106. In this situation, the characteristic of the attenuator 114 may be pre-determined and stored in the system media 218 of the radar system 102 or the computer-readable media 204 of the computing device 104. As such, the radar system 102 can indirectly determine the characteristic by accessing or receiving the pre-determined characteristic.

As another example, consider if a user attaches a separate protective case to the computing device 104 that effectively increases the thickness 124 of the exterior housing 106. In this case, the attenuation mitigator 220 can directly determine the characteristic by analyzing the reflected portion 116 of the radar signal 112. The attenuation mitigator 220 may initiate a calibration procedure that transmits a dedicated radar signal. Alternatively, the attenuation mitigator 220 can process returns from other radar signals that are designed for detecting or tracking the target 128.

The direct method is also advantageous for situations in which the operating environment may vary, such as when the attenuator 114 is separate from the computing device 104 and the radar system 102 or the radar system 102 is mobile. As an example, consider the situation in which the user places a radar-based security system inside a house or a radar-based driving assistance system inside the vehicle 108 of FIG. 1. The radar system 102 can use the direct method to automatically measure the distance 122 or the thickness 124 of the attenuator 114 in these situations. The attenuation mitigator 220 can also record the determined characteristic of the attenuator 114 in the system media 218 for future reference.

At 606, a desired frequency and a desired steering angle of the radar signal that mitigates attenuation of the radar signal through the attenuator is determined based on the thickness of the attenuator and the distance between the attenuator and the radar system. The attenuation mitigator 220, for example, can select a range of frequencies 118 and a range of steering angles 120 that reduce attenuation and spectral distortion caused by the attenuator 114. These properties are useful for improving performance of the radar system 102 without adjusting the transmit power. In situations in which the distance 122 or the thickness 124 are adjustable, the attenuation mitigator 220 can also send commands to adjust these characteristics, such as by commanding the movable platform 308 or prompting the user via the radar-based application 206.

At 608, the radar signal is transmitted using the desired frequency and the desired steering angle effective to detect the target through the attenuator. For example, the attenuation mitigator 220 can send commands to the transceiver 214 for setting a center frequency, a bandwidth, an azimuth, or an elevation of the radar signal 112. In general, the determined property of the radar signal 112 adjusts the attenuation to a desired amount to enable the target 128 to be detected within a desired operating range of the radar system 102. By reducing the attenuation, accuracy of the radar system 102 increases, thereby enabling the radar system 102 to support a variety of applications, including user authentication, gesture control, vehicle collision avoidance, security monitoring, and so forth. The method 600 can also be adapted for other characteristics of the attenuator 114 and properties of the radar signal 112 as mentioned above. Furthermore, these techniques facilitate integration of the radar system 102 within the computing device 104 as well as user operation of the radar system 102 in a variety of environments that include attenuators 114.

Example Computing System

Figure 7:
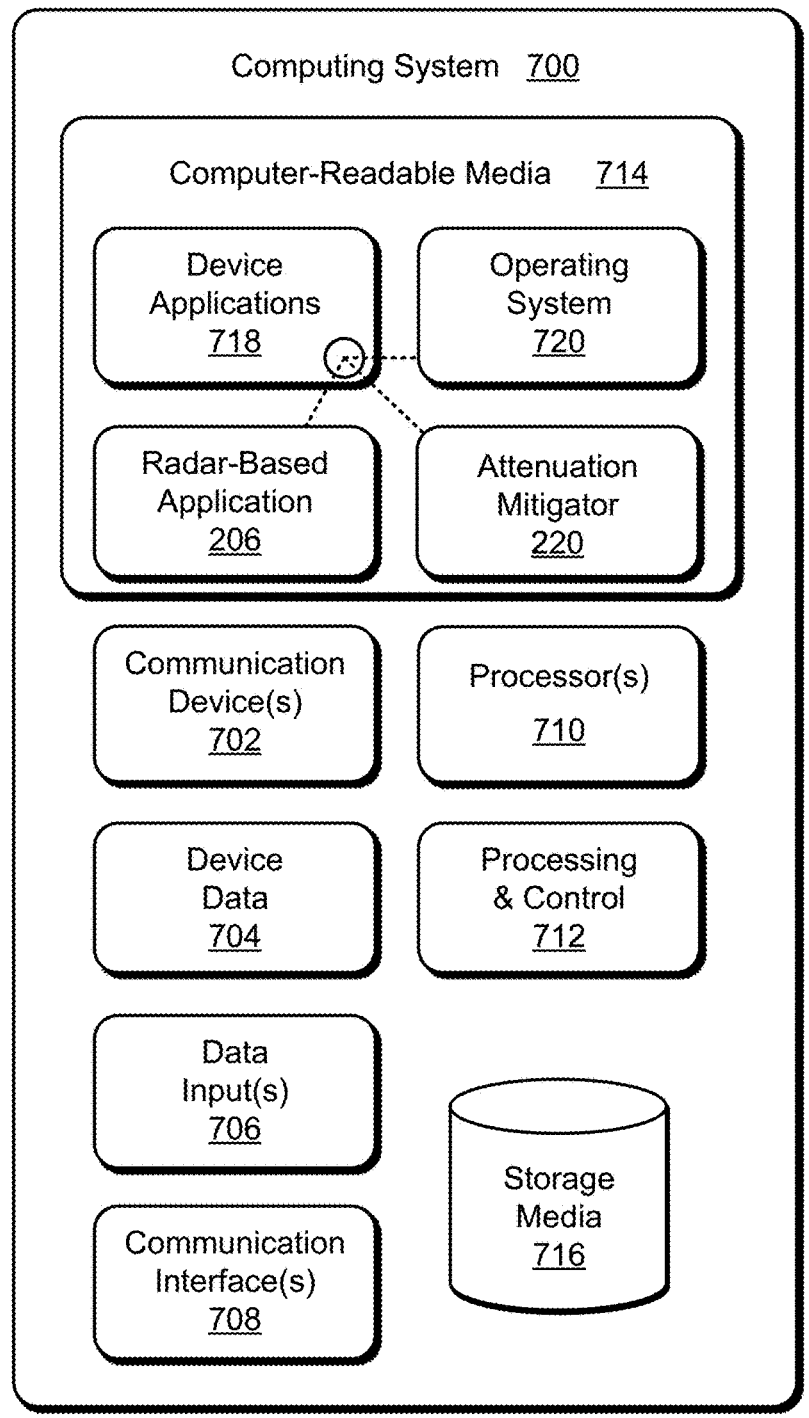
FIG. 7 illustrates an example computing system embodying, or in which techniques may be implemented that enable radar attenuation mitigation.

FIG. 7 illustrates various components of example computing system 700 that can be implemented as any type of client, server, and/or computing device as described with reference to the previous FIGS. 1 and 2 to implement radar attenuation mitigation.

The computing system 700 includes communication devices 702 that enable wired and/or wireless communication of device data 704 (e.g., received data, data that is being received, data scheduled for broadcast, data packets of the data). The device data 704 or other device content can include configuration settings of the device, media content stored on the device, and/or information associated with a user of the device. Media content stored on the computing system 700 can include any type of audio, video, and/or image data. The computing system 700 includes one or more data inputs 706 via which any type of data, media content, and/or inputs can be received, such as human utterances, characteristics of the attenuator 114 or information regarding integration of the radar system 102 within the computing system 700, user-selectable inputs (explicit or implicit), messages, music, television media content, recorded video content, and any other type of audio, video, and/or image data received from any content and/or data source.

The computing system 700 also includes communication interfaces 708, which can be implemented as any one or more of a serial and/or parallel interface, a wireless interface, any type of network interface, a modem, and as any other type of communication interface. The communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700 and to enable techniques for, or in which can be embodied, radar attenuation mitigation. Alternatively or in addition, the computing system 700 can be implemented with any one or combination of hardware, firmware, or fixed logic circuitry that is implemented in connection with processing and control circuits which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes a computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, a hardware abstraction layer for a particular device, and so on.

The device applications 718 also any include system components, engines, or managers to implement radar attenuation mitigation. In this example, device applications 718 include the radar-based application 206 and the attenuation mitigator 220.

CONCLUSION

Although techniques using, and apparatuses including, radar attenuation mitigation have been described in language specific to features and/or methods, it is to be understood that the subject of the appended claims is not necessarily limited to the specific features or methods described. Rather, the specific features and methods are disclosed as example implementations of radar attenuation mitigation.

What is claimed is:

1. An apparatus comprising:
a computing device having an exterior housing;
a movable platform;
an attenuator, the attenuator located between a radar system and a target, the attenuator comprising at least a portion of the exterior housing and having a semi-transparent material that attenuates a radar signal, the attenuator located at the distance from the radar system and having a non-zero thickness; and
the radar system, the radar system located within the exterior housing of the computing device, mounted to the movable platform, and configured to:
operate within a frequency range and a range of steering angles;
transmit the radar signal using a frequency of the frequency range and a steering angle of the range of steering angles to detect the target; and
dynamically adjust, during operation of the radar system, the distance from the radar system to the attenuator, the dynamic adjustment of the distance being effective to mitigate attenuation of the radar signal to be between a minimum attenuation and approximately thirty percent above the minimum attenuation that exists across a range of distances and a range of thicknesses for the frequency of the radar signal and the steering angle of the radar signal.

2. The apparatus of claim 1, wherein:
the range of distances includes approximately 0 millimeters to 5 millimeters; and the range of thicknesses includes approximately 0.2 millimeters to 2 millimeters.

3. The apparatus of claim 1, wherein the attenuator comprises a dielectric material having a dielectric constant between approximately four and ten.

4. The apparatus of claim 3, wherein the dielectric material includes a glass material.

5. The apparatus of claim 1, further comprising:
another attenuator located between the radar system and the target, the other attenuator having another semi-transparent material that attenuates the radar signal, and wherein:
the non-zero thickness of the attenuator includes the thickness of the other attenuator.

6. The apparatus of claim 5, wherein the other attenuator comprises a protective case enclosing at least a portion of the exterior housing of the computing device.

7. The apparatus of claim 1, wherein:
the radar system is configured to transmit another radar signal using another frequency of the frequency range and the steering angle; and
the radar system is configured to adjust the distance between the radar system and the attenuator to a particular distance within the range of distances, the particular distance being effective to mitigate the attenuation of the other radar signal to be between another minimum attenuation and approximately thirty percent above the other minimum attenuation that exists across the range of distances and the range of thicknesses for the other frequency of the radar signal and the steering angle of the other radar signal.

8. A system comprising:
a vehicle having a windshield;
an attenuator having a thickness and a semi-transparent material that attenuates a radar signal, the attenuator comprising at least a portion of the windshield; and
a radar system located inside the vehicle and on a side of the attenuator, the radar system configured to:
dynamically determine, during operation of the radar system, a desired frequency and a desired steering angle of the radar signal based on the thickness of the attenuator and a distance between the attenuator and the radar system; and
transmit the radar signal using the desired frequency and the desired steering angle effective to detect a target located on an opposite side of the attenuator.

9. The system of claim 8, wherein the desired frequency and the desired steering angle enables the radar system to detect the target through the attenuator without increasing a transmit power of the radar system.

10. The system of claim 8, wherein the radar system is further configured to:
measure the distance between the radar system and the windshield; and
determine, based on the measured distance, the desired frequency of the radar signal that mitigates attenuation of the radar signal through the attenuator to be between a minimum attenuation for the measured distance and approximately thirty percent above the minimum attenuation.

11. The system of claim 8, wherein the radar system is further configured to:
measure the thickness of the windshield; and
determine, based on the measured thickness, the desired steering angle of the radar signal that mitigates attenuation of the radar signal to be between a minimum attenuation for the measured thickness and approximately thirty percent above the minimum attenuation.

12. The system of claim 8, wherein:
the radar signal includes a frequency modulated radar signal; and
the desired frequency includes a range of desired frequencies that reduce spectral distortion of the radar signal based on the distance between the attenuator and the radar system.

13. A method comprising:
determining, by a radar system located inside a vehicle, a thickness of an attenuator that is located between the radar system and a target, the vehicle having a windshield, the attenuator comprising the windshield and having a semi-transparent material that attenuates a radar signal;
determining, by the radar system, a distance between the attenuator and the radar system;
dynamically determining, during operation of the radar system and based on the thickness of the attenuator and the distance between the attenuator and the radar system, a desired frequency and a desired steering angle of the radar signal that mitigates attenuation of the radar signal through the attenuator; and
transmitting the radar signal using the desired frequency and the desired steering angle effective to detect the target through the attenuator.

14. The method of claim 13, wherein:
the desired frequency comprises a frequency within a range of frequencies;
the desired steering angle comprises a steering angle within a range of steering angles; and
the desired frequency and the desired steering angle being effective to mitigate the attenuation of the radar signal to be between a minimum attenuation and approximately thirty percent above the minimum attenuation that exists across the range of frequencies and the range of steering angles for the thickness of the attenuator and the distance between the attenuator and the radar system.

15. The method of claim 13, wherein determining the thickness of the attenuator and determining the distance between the attenuator and the radar system includes performing, by the radar system, a calibration procedure that measures, using another radar signal, the thickness of the attenuator and the distance between the attenuator and the radar system.

16. The method of claim 15, further comprising prompting a user to adjust the distance between the radar system and the attenuator by moving the radar system to a desired distance within a range of distances, the desired distance being effective to mitigate the attenuation of the radar signal to be between a minimum attenuation and approximately ten percent above the minimum attenuation that exists across the range of distances for the thickness of the attenuator, the desired frequency, and the desired steering angle.

17. The method of claim 15, further comprising prompting a user to increase the thickness of the attenuator by positioning another attenuator between the radar system and the target to achieve a desired thickness within a range of thicknesses, the desired thickness being effective to mitigate the attenuation of the radar signal through the attenuator and the other attenuator to be between a minimum attenuation and approximately ten percent above the minimum attenuation that exists across the range of thicknesses for the distance between the radar system and the attenuator, the desired frequency, and the desired steering angle.

18. The apparatus of claim 1, wherein the radar system is further configured to, in response to a change in the thickness of the attenuator or the frequency range and the range of steering angles the radar system operates within, to provide an alert, via the computing device, to locate the radar system at a second distance from the attenuator, the second distance effective to maintain attenuation of the radar signal to be between a minimum attenuation and approximately thirty percent above the minimum attenuation that exists across the range of distances and the range of thicknesses for the frequency of the radar signal and the steering angle of the radar signal.

19. The system of claim 8, wherein the radar system is further configured to:
- determine, based on the distance between the attenuator and the radar system and the thickness of the attenuator, a desired range of frequencies for the desired steering angle,
- transmit the radar signal using the desired range of frequencies and the desired steering angle effective to avoid interference, avoid a Doppler blind zone, or support frequency diversity.

20. The system of claim 8, wherein the radar system is mounted to a movable platform, the radar system is configured to adjust the distance between the radar system and the attenuator to another distance within a range of distances, the other distance being effective to mitigate the attenuation of the radar signal to be between a minimum attenuation and approximately thirty percent above the minimum attenuation that exists across the range of distances for the desired frequency and the desired steering angle of the radar signal.

\* \* \* \* \*